US012717583B2

(12) United States Patent
Chaffin et al.

(10) Patent No.: US 12,717,583 B2
(45) Date of Patent: Aug. 25, 2026

(54) PROCESSOR MACRO-OPERATION FUSION

(71) Applicant: Ampere Computing LLC, Santa Clara, CA (US)

(72) Inventors: Benjamin Crawford Chaffin, Portland, OR (US); Bret Toll, Hillsboro, OR (US); Jacob Daniel Morgan, Forest Grove, OR (US); Rishank Santosh Nair, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 18/491,242

(22) Filed: Oct. 20, 2023

(65) Prior Publication Data

US 2025/0130807 A1 Apr. 24, 2025

(51) Int. Cl.
*G06F 9/30* (2018.01)

(52) U.S. Cl.
CPC ........ *G06F 9/30181* (2013.01); *G06F 9/3001* (2013.01); *G06F 9/30145* (2013.01)

(58) Field of Classification Search
CPC . G06F 9/3001; G06F 9/30145; G06F 9/30181
See application file for complete search history.

(56) References Cited

U.S. PATENT DOCUMENTS

| | | | | |
|---|---|---|---|---|
| 6,889,318 | B1 * | 5/2005 | Wichman | G06F 9/3853 712/226 |
| 2014/0281397 | A1 * | 9/2014 | Loktyukhin | G06F 9/30181 712/208 |
| 2017/0177343 | A1 * | 6/2017 | Lai | G06F 9/3016 |
| 2018/0095752 | A1 * | 4/2018 | Kudaravalli | G06F 12/0875 |
| 2020/0104136 | A1 * | 4/2020 | Whalley | G06F 9/30072 |
| 2020/0183687 | A1 * | 6/2020 | Asanovic | G06F 9/3844 |
| 2023/0418612 | A1 * | 12/2023 | Du Bois | G06F 9/30181 |
| 2024/0020126 | A1 * | 1/2024 | Waterman | G06F 9/3017 |

* cited by examiner

*Primary Examiner* — Jacob Petranek
(74) *Attorney, Agent, or Firm* — Muncy, Geissler, Olds, & Lowe, P.C.

(57) ABSTRACT

Disclosed are techniques for macro-operation fusion. In an aspect, a method for macro-operation fusion comprises detecting that a plurality of macro-operations involving a first register is a fusible set of macro-operations comprising a first macro-operation to perform an arithmetic operation using a second register and a second macro-operation to perform the arithmetic operation using an immediate value, wherein the arithmetic operation is addition or subtraction. The method also comprises decoding the fusible set to one micro-operation that performs functions of the fusible set, and executing the one micro-operation that performs the functions of the fusible set. In some aspects, the detection, decoding, and executing steps may be performed by an instruction fetch unit, a decoder unit, and an execution unit, respectively, of a processor. In some aspects, the instruction fetch unit routes the fusible set of macro-operations to the same decoder unit from a plurality of available decoder units.

5 Claims, 3 Drawing Sheets

PROCESSOR MACRO-OPERATION FUSION

BACKGROUND

I. Field of the Disclosure

Aspects of the disclosure relate generally to the hardware optimization of instruction execution by a processor.

II. Background

The term instruction set architecture (ISA) refers to the design of instructions that will be executed by processor hardware. The available instructions and the hardware that will execute those instructions are intimately related, i.e., the target instructions can drive hardware design, and target hardware can drive instruction set design. This is seen, for example, when comparing reduced instruction set computing (RISC) versus complex instruction set computing (CISC): having a rich set of instructions to choose from (i.e., CISC) can drive the processor hardware to become larger and more complex to support those complex functions, while limiting the set of instructions to a smaller number of simpler operations (i.e., RISC) can allow the hardware to be simpler and faster.

ISA design is intimately tied to hardware architecture and may give much less consideration, if any, to what instructions are likely to be executed and in what order. As a result, there may be sets of specific instructions—referred to herein as "instruction tuples"—that are often executed together or in a specific sequence, and these instruction tuples may be fruitful targets for some level of hardware optimization.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for macro-operation fusion includes detecting that a plurality of macro-operations involving a first register is a fusible set of macro-operations comprising a first macro-operation to perform an arithmetic operation using a second register and a second macro-operation to perform the arithmetic operation using an immediate value, wherein the arithmetic operation is addition or subtraction; decoding the fusible set of macro-operations to one micro-operation that performs functions of the fusible set of macro-operations; and executing the one micro-operation that performs the functions of the fusible set of macro-operations.

In an aspect, an apparatus for macro-operation fusion includes an instruction cache for storing macro-operations; and processing circuitry configured to: identify, from the macro-operations provided by the instruction cache, a plurality of macro-operations involving a first register as a fusible set of macro-operations comprising a first macro-operation to perform an arithmetic operation using a second register and a second macro-operation to perform the arithmetic operation using an immediate value, wherein the arithmetic operation is addition or subtraction; decode the fusible set of macro-operations to one micro-operation that performs functions of the fusible set of macro-operations; and execute the one micro-operation that performs the functions of the fusible set of macro-operations.

In an aspect, an apparatus for macro-operation fusion includes first means for detecting that a plurality of macro-operations involving a first register is a fusible set of macro-operations comprising a first macro-operation to perform an arithmetic operation using a second register and a second macro-operation to perform the arithmetic operation using an immediate value, wherein the arithmetic operation is addition or subtraction; second means for decoding the fusible set of macro-operations to one micro-operation that performs functions of the fusible set of macro-operations; and third means for executing the one micro-operation that performs the functions of the fusible set of macro-operations.

In an aspect, a non-transitory computer-readable medium storing computer-executable instructions that, when executed by an apparatus, cause the apparatus to: detect that a plurality of macro-operations involving a first register is a fusible set of macro-operations comprising a first macro-operation to perform an arithmetic operation using a second register and a second macro-operation to perform the arithmetic operation using an immediate value, wherein the arithmetic operation is addition or subtraction; decode the fusible set of macro-operations to one micro-operation that performs functions of the fusible set of macro-operations; and execute the one micro-operation that performs the functions of the fusible set of macro-operations.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION OF THE DRAWINGS

Disclosed are techniques for macro-operation fusion. In an aspect, a method for macro-operation fusion comprises detecting that a plurality of macro-operations involving a first register is a fusible set of macro-operations, decoding the fusible set of macro-operations to one micro-operation that performs functions of the fusible set of macro-operations, and executing the one micro-operation that performs the functions of the fusible set of macro-operations, wherein the fusible set of macro-operations comprises a first macro-operation to perform an arithmetic operation using a second register and a second macro-operation to perform the arithmetic operation using an immediate value, wherein the arithmetic operation is addition or subtraction. In some aspects, the detection, decoding, and executing steps may be performed by an instruction fetch unit, a decoder unit, and an execution unit, respectively, of a processor. In some aspects, the instruction fetch unit routes the fusible set of macro-operations to the same decoder unit from a plurality of available decoder units.

Figure 1:
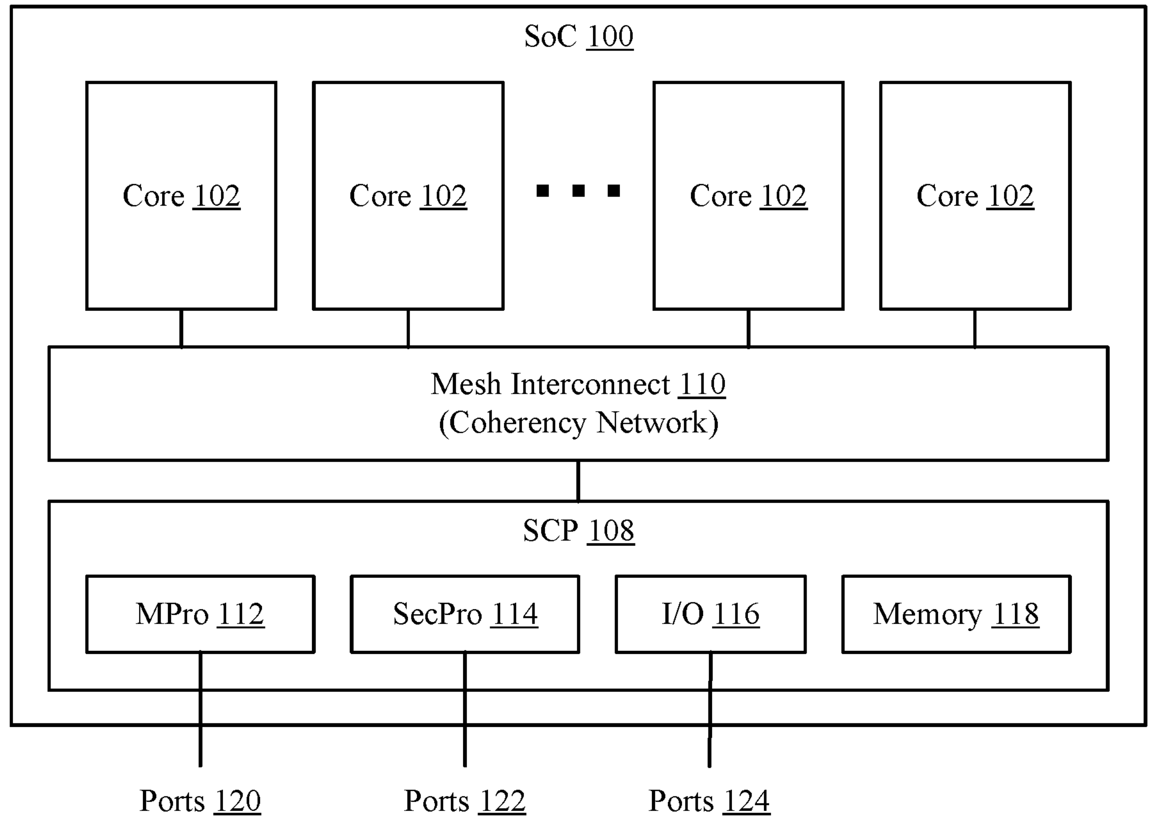
FIG. 1 is a block diagram of a many-core system on a chip (SoC) that supports macro-operation fusion, according to aspects of the disclosure.

FIG. 1 is a diagram of a many-core system on a chip (SoC) 100 that supports macro-operation fusion, according to aspects of the disclosure. The SoC 100 illustrated in FIG. 1 includes a set of processing cores 102 (or simply "cores" 102). The SoC 100 also includes a system control processor (SCP) 108 that handles many of the system management functions of the SoC 100. The cores 102 are connected to the SCP 108 via a mesh interconnect 110 that forms a high-speed bus that couples each of core 102 to the other cores 102 and to other on chip and off-chip resources, including higher levels of memory (e.g., a level three (L3) cache, dual data rate (DDR) memory), peripheral component interconnect express (PCIe) interfaces, and/or other resources.

The SCP 108 may include a variety of system management functions, which may be divided across multiple functional blocks or which may be contained in a single functional block. In the example illustrated in FIG. 1, the system management functions of the SCP 108 are divided between a management processor (MPro) 112 and a security processor (SecPro) 114 coupled to other components of the SoC 100 by the mesh interconnect 110. The SoC 100, the MPro 112, and the SecPro 114 may each include joint test action group (JTAG) ports and firmware, which may be connected to other components within the SoC 100 via the mesh interconnect 110, an inter-integrated circuit (I2C) interface, or other connection. In the example illustrated in FIG. 1, the SCP 108 further includes an input/output (I/O) block 116 and a shared memory 118 also coupled to other components of the SoC 100 by the mesh interconnect 110. Note that although FIG. 1 illustrates the MPro 112 and the SecPro 114 as separate microcontrollers (or processors), as will be appreciated, they may be combined into one or two microcontrollers, or sub-divided into more than two microcontrollers.

The MPro 112 and the SecPro 114 may include a bootstrap controller and an I2C controller or other bus controller. The MPro 112 and the SecPro 114 may communicate with on-chip sensors, an off-chip baseboard management controller (BMC), and/or other external systems to provide control signals to external systems. The MPro 112 and the SecPro 114 may connect to one or more off-chip systems as well via ports 120 and ports 122, respectively, and/or may connect to off-chip systems via the I/O block 116, e.g., via ports 124.

The MPro 112 performs error handling and crash recovery for the cores 102 of the SoC 100 and performs power management, power failure detection, recovery, and other fail safes for the SoC 100. The MPro 112 may also report power conditions and throttling to an operating system (OS) or hypervisor running on the SoC 100. The MPro 112 may connect to the shared memory 118, the SecPro 114, and external systems (e.g., VRs) via ports 120, and may supply power to each via power lines.

The SecPro 114 manages the boot process and performs security sensitive operations and only runs authenticated firmware. More specifically, the components of the SoC 100 may be divided into trusted components and non-trusted components, where the trusted components may be verified by certificates in the case of software and firmware components, or may be pure hardware components, so that at boot time, the SecPro 114 may ensure that the boot process is secure.

The I/O block 116 may connect over ports 124 to external systems and memory (not shown) and connect to the shared memory 118. The SCP 108 may use the I/O connections of the I/O block 116 to interface with a BMC or other management system(s) for the SoC 100 and/or to the network of the cloud platform (e.g., via gigabit ethernet, PCIe, or fiber). The SCP 108 may perform scaling, balancing, throttling, and other control processes to manage the cores 102, associated memory controllers, and mesh interconnect 110 of the SoC 100.

In some aspects, the mesh interconnect 110 is part of a coherency network. There are points of coherency somewhere in the mesh network depending on the address and target memory. A coherency network typically includes control registers, status registers, and state machines, and in the example illustrated in FIG. 1, these are initialized by the MPro 112, e.g., based on system and memory configuration, and the MPro 112 monitors the coherency domain for errors.

Figure 2:
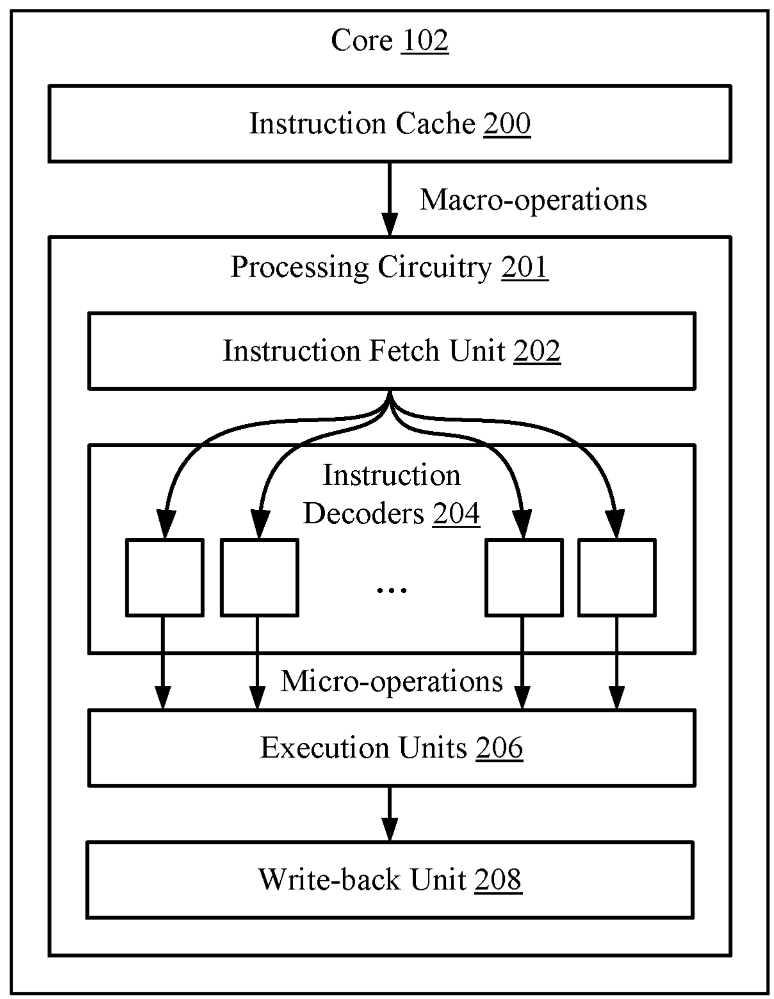
FIG. 2 is a block diagram of a core that supports macro-operation fusion, according to aspects of the disclosure.

FIG. 2 is a simplified block diagram of a core 102, according to aspects of the disclosure. In the example shown in FIG. 2, the core 102 includes an instruction cache 200 for storing macro-operations, and processing circuitry 201 configured to identify, from macro-operations provided by the instruction cache 200, a plurality of macro-operations as a fusible set of macro-operations, to decode the fusible set of macro-operations to one micro-operation that performs functions of the fusible set of macro-operations, and to execute the one micro-operation that performs the functions of the fusible set of macro-operations.

In some aspects, such as the example shown in FIG. 2, the processing circuitry 201 comprises an instruction fetch unit 202, decoders 204, execution units 206, and a write-back unit 208. Software is compiled into a sequence of instructions, referred to herein as macro-operations, which are stored in the instruction cache 200 in preparation for being executed by one or more of the execution units 206. During instruction fetch, macro-operations are assigned to one or more of the decoders 204, which translate the macro-operations into one or more micro-operations that are natively executed by the execution units 206. The write-back unit 208 handles storing the results to memory.

In an aspect of the present disclosure, the instruction fetch unit 202 is configured to identify sets of two or more macro-operations that may be fused and steer them to a single decoder 204. In some aspects, the decoder 204 is configured so that, when it receives the set of fusible macro-operations simultaneously or contemporarily, it decodes the set of macro-operations into the appropriate single, new micro-operation. In some aspects, the new micro-operation is sent to one of the execution units 206, which is configured to execute the new micro-operation. In this manner, one of the execution units 206 can perform the work of two or more macro-instructions in a single micro-operation, or in more than one micro-operation but less than the number of micro-operations that would be required without this optimization.

In some aspects, the instruction fetch unit 202 is configured to detect a pair of macro-operations consisting of an addition (ADD) macro-operation followed by an increment (INC) macro-operation performed on the result of the ADD. This may be referred to herein as an "A+B+1" operation. Upon detection of this fusible pair of macro-operations, the instruction fetch unit 202 then ensures that ADD and INC macro-operations are routed to the same decoder 204. The decoder 204 receives the fusible pair of macro-operations, and rather than decoding them into separate ADD and INC micro-operations, decodes them into a single micro-operation that performs the functions of both macro-operations. In one example implementation, the A+B+1 function can be implemented using existing hardware by a new micro-operation that forces the value of the carry-in bit to a logic “1” (rather than its normal value of logic “0”) during the ADD operation, which forces the result of the ADD operation to be incremented by one.

In some aspects, the instruction fetch unit 202 is configured to detect a pair of macro-operations consisting of a subtraction (SUB) macro-operation followed by a decrement (DEC) macro-operation performed on the result of the SUB. This may be referred to herein as an “A−B−1” operation. Upon detection of this fusible pair of macro-operations, the instruction fetch unit 202 then ensures that SUB and DEC macro-operations are routed to the same decoder 204. The decoder 204 receives the fusible pair of macro-operations, and rather than decoding them into separate SUB and DEC micro-operations, decodes them into a single micro-operation that performs the functions of both macro-operations. In one example implementation, the A−B−1 function can be implemented using existing hardware by a new micro-operation that forces the value of the carry-in bit to a logic “0” (rather than its normal value of logic “1”) during the SUB operation, which forces the result of the SUB operation to be decremented by one.

In contrast to other optimization approaches that involve creating a new macro-operation, the techniques disclosed herein involve an optimization of existing macro-operations into a new, more efficient micro-operation. For example, in both the A+B+1 and A−B−1 examples above, a pair of macro-operations are fused into a single micro-operation. This has the advantage that such optimizations can be made without modifying the macro-operations, e.g., without changing the instruction set architecture. The A+B+1 and A−B−1 optimizations have the further advantage that they can be implemented with minimal change to the processor hardware, e.g., to set the value of the carry-in bit to a logic “1” for the A+B+1 operation and to a logic “0” for the A−B−1 operation, although these implementations are illustrated and not limiting, i.e., other hardware implementations are also contemplated by the present disclosure.

It will also be understood that the same optimization may be performed on more than one set of macro-operations. For example, “add B to A, then increment A” is equivalent to “increment A, then add B to A.” Thus, in some aspects, the instruction fetch unit 202 are configured to identify a number of different fusible sets of macro-operations to be routed to the same decoder 204, and the decoders 204 are configured to decode these different fusible sets of macro-operations into optimized micro-operations.

It will also be understood that a similar optimization may be performed for the more general cases of A+B+N and A−B−N, where N is greater than 1. For example, a single micro-operation can be arbitrarily complex, and could be implemented to consume one or more than one clock cycles. In some aspects, an operation such as A+B+N is implemented by hardware that adds three full-size integers. In some aspects, certain values of N may be factored into a combination of left-shifts and +1 increments, which may be implemented using existing hardware. Other hardware optimizations are also within the scope of the subject matter. These implementations are illustrative and not limiting.

Moreover, while the examples above involve combining two micro-operations—one from each of two macro-operations—into a single micro-operation, it will be understood that the same principles may be used to fuse micro-operations from more than two macro-operations, or to combine a larger number of micro-operations from two or more macro-operations into a smaller number of micro-operations that collectively perform the work of the two or more macro-operations. Here, too, the instruction fetch unit 202 may be configured to detect a fusible set of macro-operations and route them to a decoder 204 that is configured to decode such fusible sets into at least one new micro-operation that is executed by an execution unit 206 that is configured to execute the at least one new micro-operation. As an example, where a conventional processor would decode three macro-operations into three micro-operations, a processor configured according to the subject matter of the disclosure could identify the three macro-operations as a fusible set and decode them into two micro-operations, or in some cases, just one micro-operation. That is, where a conventional processor would decode M macro-operations into N micro-operations, a processor configured according to the subject matter of the disclosure would decode those M macro-operations into N' micro-operations, where N' is less than N (N'<N).

The macro-operation fusion techniques described herein provide a number of performance advantages. Macro-operation fusion improves efficiency because they cost minimal additional hardware and accomplish the same overall “work” with fewer micro-operations flowing through the machine. This uses less pipeline bandwidth, reduces the amount of tracking information needed, and reduces the number of execution resources required throughout the machine. In addition, by configuring the instruction fetch units 202, decoders 204, and execution units 206 to perform macro-operation fusion, an ISA can be virtually extended to include the equivalent of, for example, an A+B+1 macro-operation. In some aspects, a compiler can be optimized to be aware of, and take advantage of, these sets of fusible macro-operations, e.g., by generating machine code that includes specific sets of known fusible macro-operations where possible.

Figure 3:
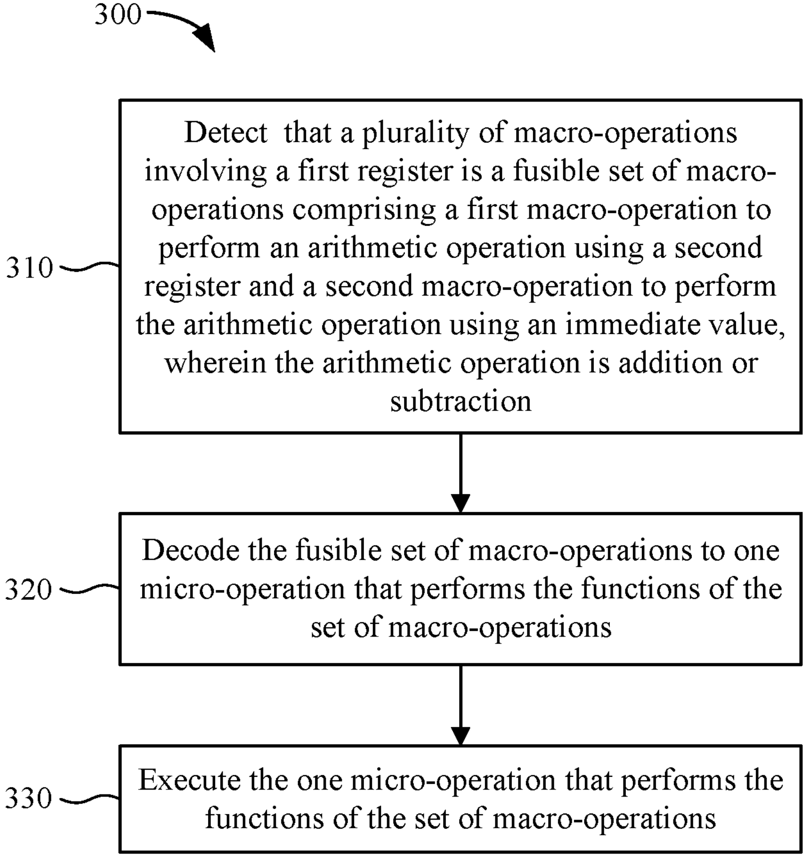
FIG. 3 is a flow chart illustrating an example process associated with macro-operation fusion, according to aspects of the disclosure.

FIG. 3 is a flow chart illustrating a process 300 for macro-operation fusion, according to aspects of the disclosure. In the example shown in FIG. 3, the process 300 includes, at 310, FIG. 3 is a flowchart of an example process 300 associated with processor macro-operation fusion, according to aspects of the disclosure. In some implementations, one or more process blocks of FIG. 3 may be performed by a processor (e.g., processor core 102). In some implementations, one or more process blocks of FIG. 3 may be performed by another device or a group of devices separate from or including the processor. Additionally, or alternatively, one or more process blocks of FIG. 3 may be performed by one or more components of a processor, such as an instruction cache 200, an instruction fetch unit 202, instruction decoder(s) 204, execution unit(s) 206, or a write-back unit 208.

As shown in FIG. 3, at block 310 process 300 may include detecting that a plurality of macro-operations involving a first register is a fusible set of macro-operations comprising a first macro-operation to perform an arithmetic operation using a second register and a second macro-operation to perform the arithmetic operation using an immediate value, wherein the arithmetic operation is addition or subtraction. It will be understood that a fusible set of macro-operations always comprises at least two more macro-operations. For example, an instruction fetch unit 202 may detect that a set or sequence of macro-operations that it is receiving from the instruction cache 200 is a fusible set of macro-operations. In some aspects, the instruction fetch unit 202 ensures that the fusible set of macro-operations is sent to the same instruction decoder 204.

As further shown in FIG. 3, at block 320, process 300 may include decoding the fusible set of macro-operations to one micro-operation that performs the functions of the set of macro-operations. For example, the instruction decoder 204 may decode the fusible set of macro-operations to one micro-operation. It will be understood that, in a conventional processor, the two or more macro-operations will be decoded into two or more micro-operations rather than into one micro-operation.

As further shown in FIG. 3, at block 330, process 300 may include executing the one-micro-operation that performs the functions of the set of macro-operations. In some aspects, the instruction decoder 204 may forward the one micro-operation to an execution unit 206 of the processor, and that the one micro-operation will cause the execution unit 206 to perform all of the functions of the set of macro-operations.

In some aspects, the arithmetic operation is addition and the micro-operation adds the second register and the immediate value to the first register. In some aspects, the immediate value is one, and the one micro-operation adds the second register to the first register while forcing a carry-in bit value to logic 1. In some aspects, the immediate value is greater than one, and the one micro-operation adds the second register and the immediate value to the first register serially or in parallel.

In some aspects, the arithmetic operation is subtraction and the micro-operation subtracts the second register and the immediate value from the first register. In some aspects, the immediate value is one, and the one micro-operation subtracts the second register from the first register while forcing a carry-in bit value to logic 1. In some aspects, the immediate value is greater than one, and the one micro-operation subtracts the second register and the immediate value from the first register serially or in parallel.

It will be understood that the specific implementations described herein are illustrative and not limiting.

Process 300 may include additional implementations, such as any single implementation or any combination of implementations described below and/or in connection with one or more other processes described elsewhere herein. Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, components, agents, IPs, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, processors, controllers, components, agents, IPs, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium or non-transitory storage media known in the art. An exemplary storage medium is coupled to the processor such that the processor can read information from, and write information to, the storage medium. In the alternative, the storage medium may be integral to the processor. The processor and the storage medium may reside in an ASIC.

Thus, the various aspects described herein may be embodied in a number of different forms, all of which being within the scope of the claimed subject matter. In addition, for each of the aspects described herein, the corresponding form of any such aspects may be described herein as, for example, “logic configured to,” “instructions that when executed perform,” “computer instructions to,” and/or other structural components configured to perform the described action.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for macro-operation fusion, the method comprising:

detecting that a plurality of macro-operations involving a first register is a fusible set of macro-operations comprising a first macro-operation to perform an arithmetic operation using a second register and a second macro-operation to perform the arithmetic operation using an immediate value, wherein the arithmetic operation is addition, the immediate value is one, and the micro-operation adds the second register to the first register while forcing a carry-in bit value to logic 1, or wherein the arithmetic operation is subtraction, the immediate value is one, and the micro-operation subtracts the second register from the first register while forcing a carry-in bit value to logic 1;

decoding the fusible set of macro-operations to one micro-operation that performs functions of the fusible set of macro-operations; and executing the one micro-operation that performs the functions of the fusible set of macro-operations.

2. An apparatus for macro-operation fusion, the apparatus comprising:

an instruction cache for storing macro-operations; and processing circuitry configured to:

identify, from the macro-operations provided by the instruction cache, a plurality of macro-operations involving a first register as a fusible set of macro-operations comprising a first macro-operation to perform an arithmetic operation using a second register and a second macro-operation to perform the arithmetic operation using an immediate value, wherein the arithmetic operation is addition, the immediate value is one, and the micro-operation adds the second register to the first register while forcing a carry-in bit value to logic 1, or wherein the arithmetic operation is subtraction, the immediate value is one, and the micro-operation subtracts the second register from the first register while forcing a carry-in bit value to logic 1;

decode the fusible set of macro-operations to one micro-operation that performs functions of the fusible set of macro-operations; and execute the one micro-operation that performs the functions of the fusible set of macro-operations.

3. The apparatus of claim 2, wherein the processing circuitry comprises:

an execution unit for executing micro-operations;

a plurality of decoder units, each for decoding macro-operations into micro-operations; and an instruction fetch unit for providing macro-operations from the instruction cache to the plurality of decoder units, wherein the instruction fetch unit identifies the plurality of macro-operations involving the first register as the fusible set of macro-operations and routes the fusible set of macro-operations to a first decoder unit from the plurality of decoder units, wherein the first decoder unit decodes the fusible set of macro-operations to the one micro-operation that performs the functions of the fusible set of macro-operations and routes the one micro-operation to the execution unit, and wherein the execution unit executes the one micro-operation that performs the functions of the fusible set of macro-operations.

4. An apparatus for macro-operation fusion, the apparatus comprising:

first means for detecting that a plurality of macro-operations involving a first register is a fusible set of macro-operations comprising a first macro-operation to perform an arithmetic operation using a second register and a second macro-operation to perform the arithmetic operation using an immediate value, wherein the arithmetic operation is addition, the immediate value is one, and the micro-operation adds the second register to the first register while forcing a carry-in bit value to logic 1, or wherein the arithmetic operation is subtraction, the immediate value is one, and the micro-operation subtracts the second register from the first register while forcing a carry-in bit value to logic 1;

second means for decoding the fusible set of macro-operations to one micro-operation that performs functions of the fusible set of macro-operations; and third means for executing the one micro-operation that performs the functions of the fusible set of macro-operations.

5. A non-transitory computer-readable medium storing computer-executable instructions that, when executed by an apparatus, cause the apparatus to:

detect that a plurality of macro-operations involving a first register is a fusible set of macro-operations comprising a first macro-operation to perform an arithmetic operation using a second register and a second macro-operation to perform the arithmetic operation using an immediate value, wherein the arithmetic operation is addition, the immediate value is one, and the micro-operation adds the second register to the first register while forcing a carry-in bit value to logic 1, or wherein the arithmetic operation is subtraction, the immediate value is one, and the micro-operation subtracts the second register from the first register while forcing a carry-in bit value to logic 1;

decode the fusible set of macro-operations to one micro-operation that performs functions of the fusible set of macro-operations; and execute the one micro-operation that performs the functions of the fusible set of macro-operations.

* * * * *